United States Patent
Ma et al.

(10) Patent No.: US 7,880,830 B2
(45) Date of Patent: Feb. 1, 2011

(54) DOUBLE-SIDED LIQUID CRYSTAL DISPLAY WITH GROUPED ILLUMINATORS AND LAPTOP COMPUTER WITH SAME

(75) Inventors: Xiao-Ping Ma, Shenzhen (CN); Gao-Jie Wang, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 314 days.

(21) Appl. No.: 12/011,123

(22) Filed: Jan. 23, 2008

(65) Prior Publication Data

US 2008/0174718 A1    Jul. 24, 2008

(30) Foreign Application Priority Data

Jan. 24, 2007    (CN) .......................... 2007 1 0073108

(51) Int. Cl.
  *G02F 1/1335*   (2006.01)
  *G02F 1/133*   (2006.01)
(52) U.S. Cl. .............................. 349/65; 349/70; 349/74
(58) Field of Classification Search .................... 349/62, 349/74, 65, 68, 70
  See application file for complete search history.

(56) References Cited

U.S. PATENT DOCUMENTS 6,046,730 A * 4/2000 Bowen et al. ................ 345/168
7,234,854 B2 * 6/2007 Masamoto .................. 362/612
2004/0239832 A1 * 12/2004 Saito ........................... 349/74
2005/0151918 A1 7/2005 Park et al.
2006/0232495 A1 10/2006 Chang et al.

FOREIGN PATENT DOCUMENTS

| CN | 1637516 A | 7/2005 |
| CN | 2840104 Y | 11/2006 |
| JP | 2004-78047 A | 3/2004 |

* cited by examiner

*Primary Examiner*—Mark A Robinson
*Assistant Examiner*—Michael P Mooney
(74) *Attorney, Agent, or Firm*—Wei Te Chung

(57) ABSTRACT

An exemplary double-sided liquid crystal display includes a light guide plate, illuminators, a first liquid crystal panel, and a second liquid crystal panel. The light guide plate includes a first light emitting surface and a second light emitting surface. The first and second light emitting surfaces are configured for light emission. The illuminators are configured for providing light beams for the light guide plate. The first liquid crystal panel is configured for receiving the light beams from the first light emitting surface. The second liquid crystal panel is configured for receiving the light beams from the second light emitting surface. When the first liquid crystal panel is configured to display, the first liquid crystal panel is illuminated by only part of the illuminators. When the second liquid crystal panel is configured to display, the second liquid crystal panel is illuminated by all the illuminators.

12 Claims, 5 Drawing Sheets

DOUBLE-SIDED LIQUID CRYSTAL DISPLAY WITH GROUPED ILLUMINATORS AND LAPTOP COMPUTER WITH SAME

FIELD OF THE INVENTION

The present invention relates to a double-sided liquid crystal display (LCD) that includes at least two grouped illuminators so that the double-sided liquid crystal display has lower power consumption, and a laptop computer including the double-sided liquid crystal display.

GENERAL BACKGROUND

Liquid crystal displays are commonly used as display devices for compact electronic apparatuses, because they not only provide good quality images but are also very thin. Double-sided liquid crystal displays are more and more popular in electronic apparatuses, for example mobile phones and laptop computers.

Referring to FIG. 5, a typical double-sided liquid crystal display 10 includes a first liquid crystal panel 11, a first backlight module 12, a second backlight module 13, and a second liquid crystal panel 14, arranged in that order from top to bottom. The first backlight module 12 provides light beams for the first liquid crystal panel 11. The second backlight module 13 provides light beams for the second liquid crystal panel 14. Thus, the double-sided liquid crystal display 10 can achieve dual display. However, the double-sided liquid crystal display 10 is costly, and it is difficult to configure the double-sided liquid crystal display 10 to be thin.

Referring to FIG. 6, another typical double-sided liquid crystal display 20 includes a first liquid crystal panel 21, a second liquid crystal panel 24 opposite to the first liquid crystal panel 21, and a backlight module 22 located between the first and second liquid crystal panels 21, 24. The backlight module 22 includes a light guide plate 223, and a plurality of light emitting diodes (LEDs) 221 located adjacent to a light incident surface (not labeled) of the light guide plate 223. Thus, the backlight module 22 is configured to provide light beams for the first and second liquid crystal panels 21, 24. The first liquid crystal panel 21 has a size smaller than that of the second liquid crystal panel 24, and correspondingly requires less light beams for displaying than the second liquid crystal panel 24 does. Comparing to double-sided liquid crystal display 10, the double-sided liquid crystal display 20 is thinner. However, all the light emitting diodes 221 need to be lit up even when the small-sized first liquid crystal panel 21 is controlled to display. This results in a great waste of power consumption of the double-sided liquid crystal display 20.

What is needed, therefore, is a double-sided liquid crystal display that can circumvent, overcome or at least mitigate the above-described difficulties. What is also needed is a laptop computer employing the double-sided liquid crystal display.

SUMMARY

In one preferred embodiment, a double-sided liquid crystal display includes a light guide plate, a plurality of illuminators, a first liquid crystal panel, and a second liquid crystal panel. The light guide plate includes a first light emitting surface and a second light emitting surface. The first and second light emitting surfaces are configured (i.e., structured and arranged) for light emission. The illuminators are configured for providing light beams for the light guide plate. The first liquid crystal panel is configured for receiving the light beams from the first light emitting surface. The second liquid crystal panel is configured for receiving the light beams from the second light emitting surface. When the first liquid crystal panel is configured to display, the first liquid crystal panel is illuminated by only part of the illuminators. When the second liquid crystal panel is configured to display, the second liquid crystal panel is illuminated by all the illuminators.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments of the present invention in detail.

Figure 1:
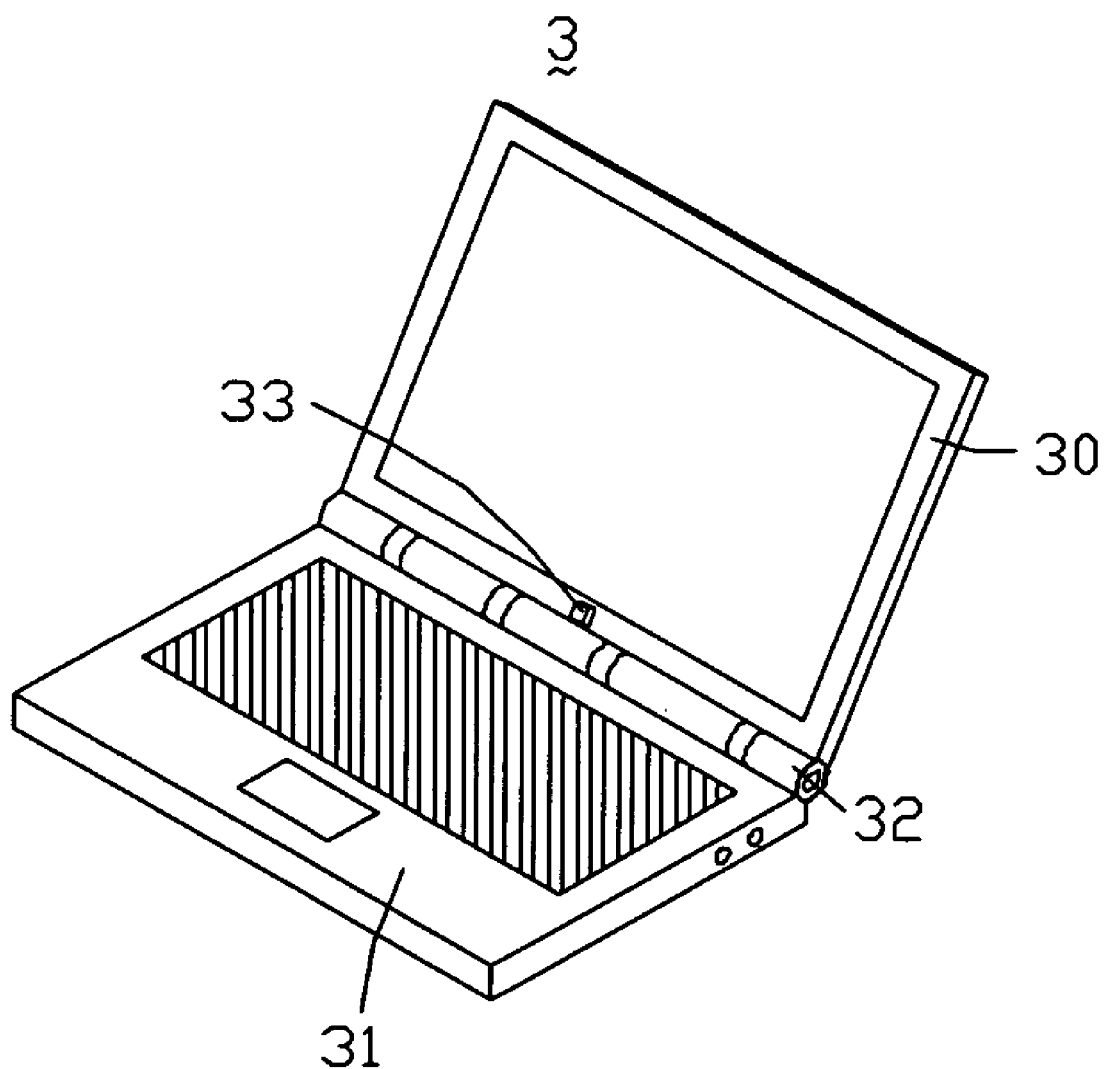
FIG. 1 is an isometric view of a laptop computer according to a first embodiment of the present invention, the laptop computer including a double-sided liquid crystal display.

Referring to FIG. 1, a laptop computer 3 according to a first embodiment of the present invention is shown. The laptop computer 3 includes a double-sided liquid crystal display 30, a host 31, a spindle 32, and a Hall-effect switch 33. The double-sided liquid crystal display 30 is pivotally engaged to the host 31 via the spindle 32, and can be pivotally rotated up and down about the spindle 32. That is, an angle (not labeled) of the double-sided liquid crystal display 30 relative to the host 31 varies corresponding to the rotation of the double-sided liquid crystal display 30. The Hall-effect switch 33 is arranged at the double-sided liquid crystal display 30, and is adjacent to the spindle 32. The Hall-effect switch 33 can monitor the variations of degrees and directions of the angle, and generate corresponding variation signals.

Figure 2:
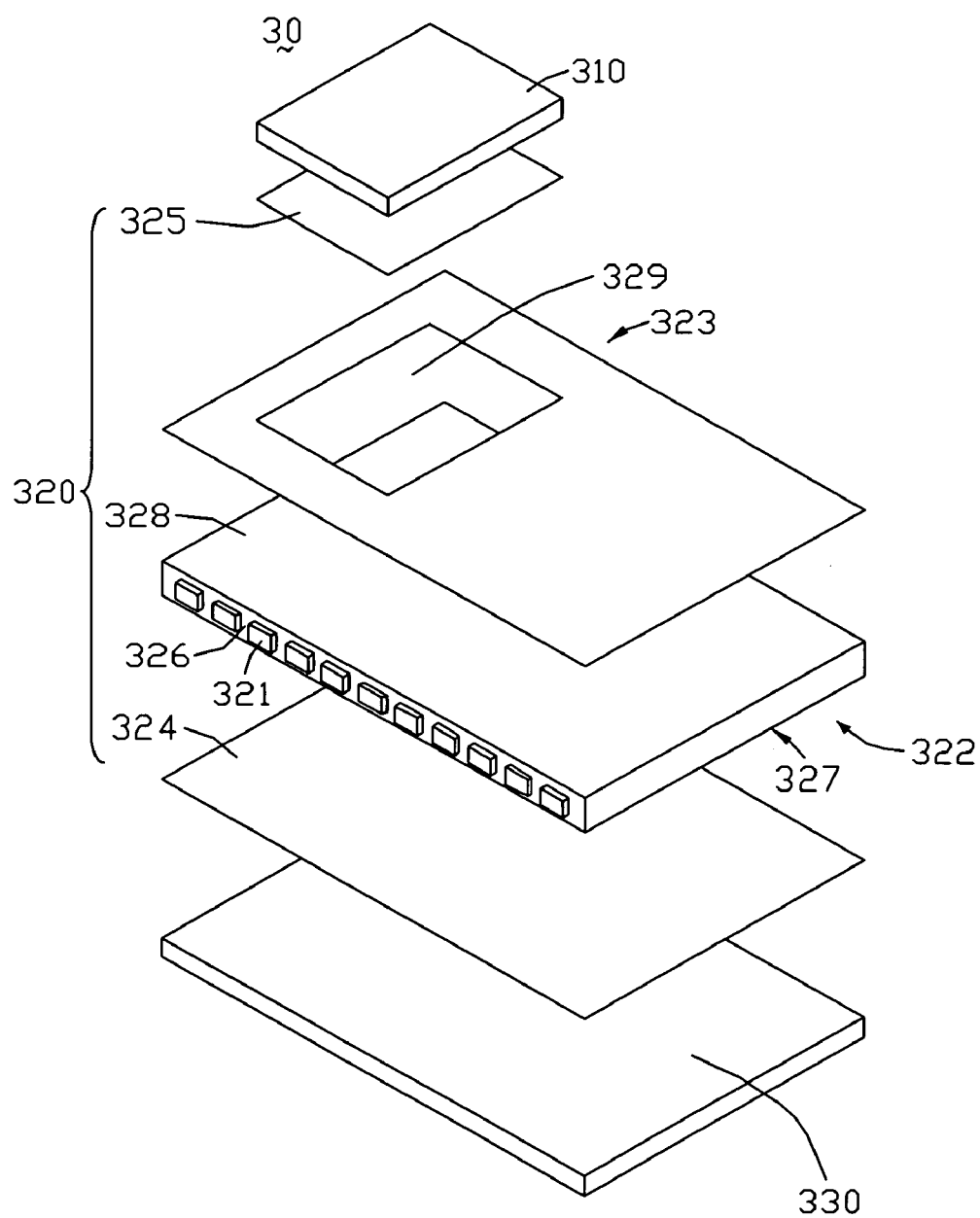
FIG. 2 is an exploded, isometric view of the double-sided liquid crystal display of FIG. 1.
Figure 3:
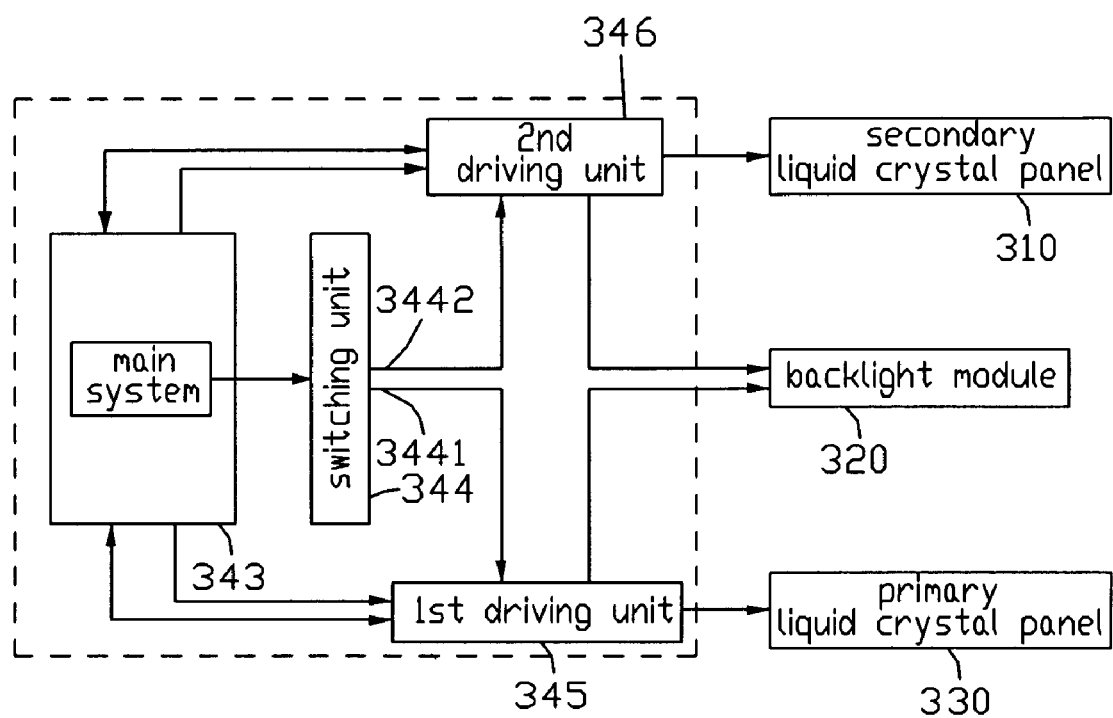
FIG. 3 is a block diagram of the double-sided liquid crystal display of FIG. 1.

Referring also to FIG. 2 and FIG. 3, the double-sided liquid crystal display 30 includes a driving circuit (not labeled), a primary liquid crystal panel 330, a secondary liquid crystal panel 310 opposite to the primary liquid crystal panel 330, and a backlight module 320 between the primary and secondary liquid crystal panels 330, 310. The backlight module 320 serves to provide planar light beams for the primary and secondary liquid crystal panels 330, 310. In the illustrated embodiment, when the laptop computer 3 is folded, the primary liquid crystal panel 330 is closer to the host 31 than the secondary liquid crystal panel 310 is. The secondary liquid crystal panel 310 has a size less than that of the primary liquid crystal panel 330, and correspondingly requires less light beams for displaying than the primary liquid crystal panel 330 does.

The backlight module 320 includes a primary optical film assembly 324, a light guide plate 322, a reflective film 323, a secondary optical film assembly 325, and a plurality of point illuminators 321. The primary optical film assembly 324, the light guide plate 322, the reflective film 323, and the secondary optical film assembly 325 are arranged in that order from bottom to top.

The light guide plate 322 includes a light incident surface 326 at a lateral thin side thereof, a first light emitting surface 327 perpendicularly connected with the light incident surface 326, and a second light emitting surface 328 opposite to the first light emitting surface 327. The primary optical film assembly 324 is arranged between the first light emitting surface 327 of the light guide plate 322 and the primary liquid crystal panel 330. The secondary optical film assembly 325 is arranged between the reflective film 323 and the secondary liquid crystal panel 310. The reflective film 323 includes a window 329 defined therein, and a reflective surface (not labeled) facing toward the second light emitting surface 328 of the light guide plate 322. A position and a size of the window 329 of the reflective film 323 respectively correspond to those of the secondary liquid crystal panel 310. The point illuminators 321 are linearly arranged adjacent to the light incident surface 326 of the light guide plate 322. All the point illuminators 321 can provide enough light beams for the primary liquid crystal panel 330, and some of the point illuminators 321 can provide enough light beams for the small-sized secondary liquid crystal panel 310. In the illustrated embodiment, the point illuminators 321 include a plurality of light emitting diodes.

In FIG. 3, a block diagram of the double-sided liquid crystal display 30 is shown. The driving circuit includes a main system 343, a switching unit 344, a first driving unit 345, and a second driving unit 346. The main system 343 can convert external voltages to voltages compatible for the first and second driving units 345, 346, and provides data signals for the first and second driving units 345, 346.

The switching unit 344 is electrically connected to the Hall-effect switch 33 and the main system 343, and includes a first channel 3441 and a second channel 3442. The first channel 3441 or the second channel 3442 can be switched on/off according to the corresponding variation signals from the Hall-effect switch 33. When the first channel 3441 is switched on, the main system 343 can provide the voltages for the first driving unit 345 via the first channel 3441, and the second driving unit 346 is switched off. When the second channel 3442 is switched on, the main system 343 can provide the voltages for the second driving unit 346 via the second channel 3442, and the first driving unit 345 is switched off.

The first driving unit 345 is further electrically connected to the primary liquid crystal panel 330, all the point illuminators 321 of the backlight module 320, and the main system 343. The second driving unit 346 is further electrically connected to the secondary liquid crystal panel 310, said some of the point illuminators 321 configured for illuminating the secondary liquid crystal panel 310, and the main system 343.

When the angle of the double-sided liquid crystal display 30 relative to the host 31 increases, and is in a predetermined range, for example from 100 to 150 degrees, the Hall-effect switch 33 generates a first variation signal to the switching unit 344. The first channel 3441 of the switching unit 344 is switched on according to the first variation signal, and the second channel 3442 is switched off. The first driving unit 345 generates a first feedback signal to the main system 343. The main system 343 provides data signals for the primary liquid crystal panel 330 according to the first feedback signal, and stops providing data signals for the secondary liquid crystal panel 310. At the same time, the first driving unit 345 provides working voltages for all the point illuminators 321 of the backlight module 320. Thus, all the point illuminators 321 are lit up to illuminate the primary liquid crystal panel 330, and the secondary liquid crystal panel 310 is switched off.

When the angle of the double-sided liquid crystal display 30 relative to the host 31 decreases, and is in a predetermined range, for example from 0 to 30 degrees, the Hall-effect switch 33 generates a second variation signal to the switching unit 344. The second channel 3442 of the switching unit 344 is switched on according to the second variation signal, and the first channel 3441 is switched off. The second driving unit 346 generates a second feedback signal to the main system 343. The main system 343 provides data signals for the secondary liquid crystal panel 310 according to the second feedback signal, and stops providing the data signals for the primary liquid crystal panel 330. At the same time, the second driving unit 346 provides the working voltages for the said some of the point illuminators 321 configured for illuminating the secondary liquid crystal panel 310. Thus, the said some of the point illuminators 321 are lit up to illuminate the secondary liquid crystal panel 310, and the primary liquid crystal panel 330 is switched off.

In summary, when the double-sided liquid crystal display 30 is rotated about the spindle 32, the angle of double-sided liquid crystal display 30 relative to the host 31 correspondingly increases or decreases. The increment of the angle generally indicates the laptop computer 3 is unfolded into a working status. Accordingly, all the point illuminators 321 are lit up to illuminate the primary liquid crystal panel 330, and the secondary liquid crystal panel 310 is switched off. On the other hand, the decrement of the angle generally indicates the laptop computer 3 is folded into a standby status. Accordingly, only the said some of the point illuminators 321 are lit up to illuminate the secondary liquid crystal panel 310, and the primary liquid crystal panel 330 is switched off. Thus, the power consumption of the double-sided liquid crystal display 30 can be reduced due to the optimized control of the point illuminators 321, and the working lives of the point illuminators 321 are also extended. Furthermore, when the secondary liquid crystal panel 310 is controlled to be switched off and the primary liquid crystal panel 330 is controlled to display, the reflective film 323 can reflective some of the light beams emitting from the second light emitting surface 328 toward the primary liquid crystal panel 330, which results in an increased ratio of light utilization of the double-sided liquid crystal panel 30.

Figure 4:
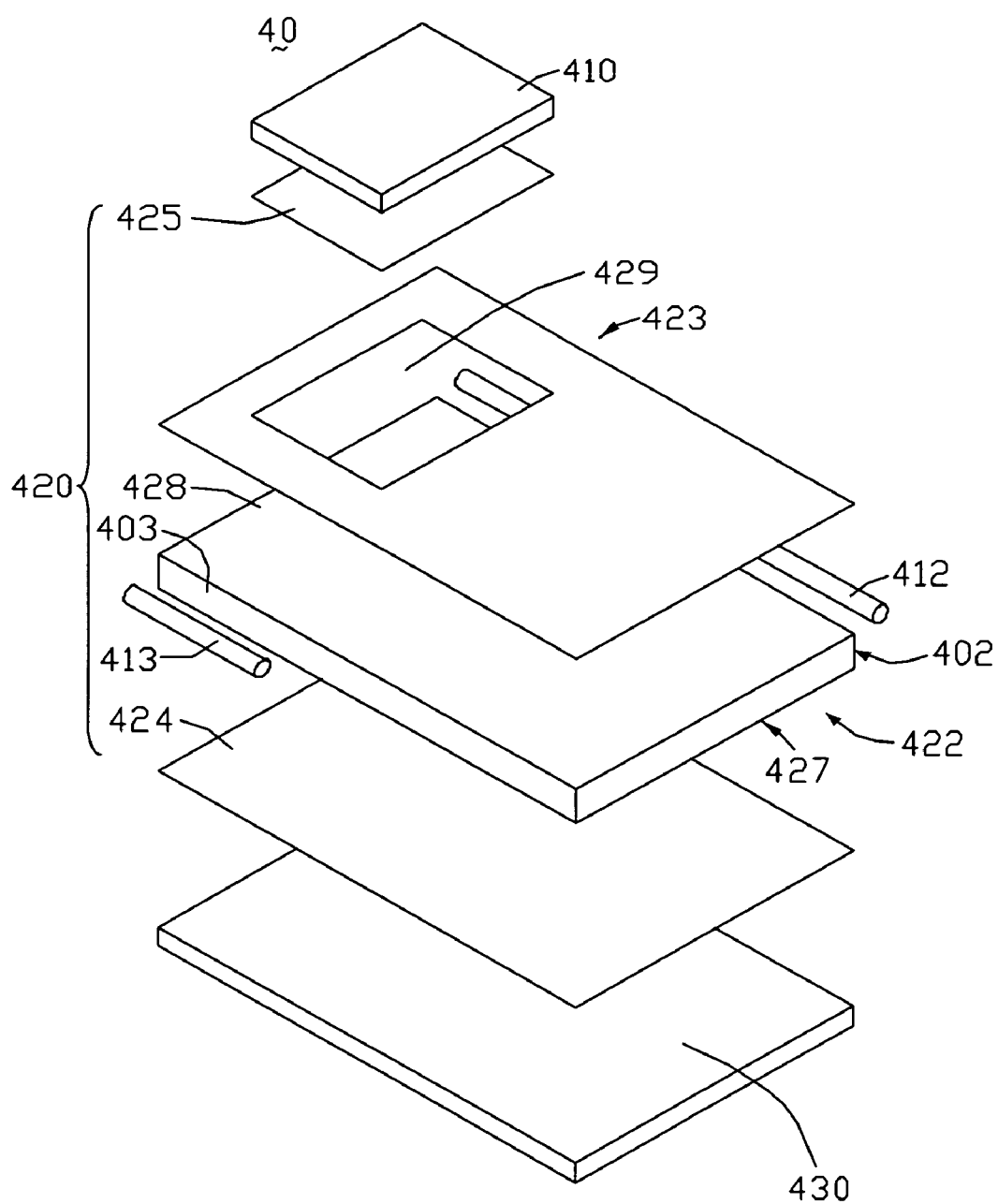
FIG. 4 is similar to FIG. 2, but showing a corresponding view in the case of a double-sided liquid crystal display of a laptop computer according to a second embodiment of the present invention.
Figure 5:
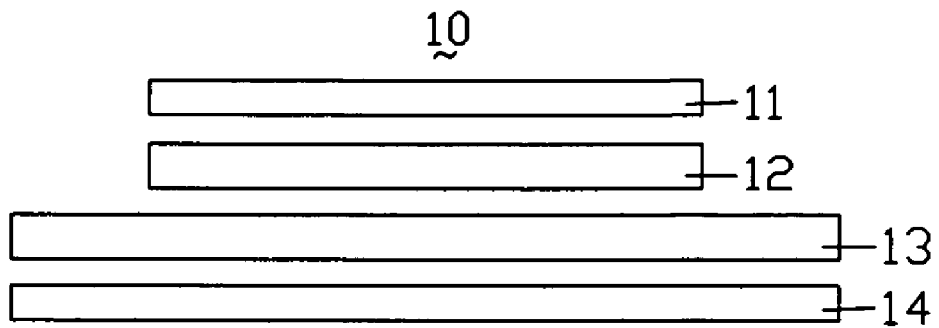
FIG. 5 is an exploded, side plan view of a conventional double-sided liquid crystal display.
Figure 6:
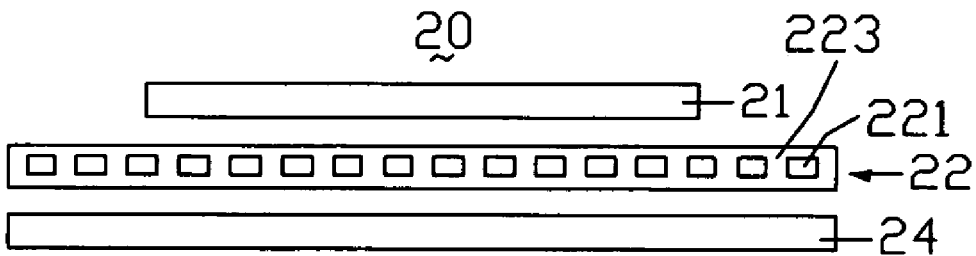
FIG. 6 is an exploded, side plan view of another conventional double-sided liquid crystal display.

Referring to FIG. 4, a double-sided liquid crystal display 40 of a laptop computer (not shown) according to a second embodiment of the present invention is similar to the double-sided liquid crystal display 30. The double-sided liquid crystal display 40 includes a driving circuit (not shown), a primary liquid crystal panel 430, a secondary liquid crystal panel 410 opposite to the primary liquid crystal panel 430, and a backlight module 420 located between the primary and secondary liquid crystal panels 430, 410. The backlight module 420 serves to provide planar light beams for the primary and secondary liquid crystal panels 430, 410. In the illustrated embodiment, when the laptop computer is folded, the primary liquid crystal panel 430 is closer to the host (not shown) than the secondary liquid crystal panel 410. The secondary liquid crystal panel 410 has a size less than that of the primary liquid crystal panel 430, and correspondingly requires fewer light beams for displaying than the primary liquid crystal panel 430.

The backlight module 420 includes a primary optical film assembly 424, a light guide plate 422, a reflective film 423, a secondary optical film assembly 425, a primary linear illuminator 412, and a secondary linear illuminator 413. The primary optical film assembly 424, the light guide plate 422, the reflective film 423, and the secondary optical film assembly 425 are arranged in that order from bottom to top.

The light guide plate 422 includes a first light incident surface 402 at a lateral thin side thereof, a second light incident surface 403 opposite to the first light incident surface 402, a first light emitting surface 427 perpendicularly connected with the first and second light incident surfaces 402, 403, and a second light emitting surface 428 opposite to the first light emitting surface 427. The primary optical film assembly 424 is arranged between the first light emitting surface 427 of the light guide plate 422 and the primary liquid crystal panel 430. The secondary optical film assembly 425 is arranged between the reflective film 423 and the secondary liquid crystal panel 410. The reflective film 423 includes a window 429 defined therein, and a reflective surface (not labeled) facing toward the second light emitting surface 428 of the light guide plate 422. A position and a size of the window 429 of the reflective film 423 respectively correspond to those of the secondary liquid crystal panel 410.

The secondary linear illuminator 413 is located adjacent to the second light incident surface 403, and can provide enough light beams for the small-sized secondary liquid crystal panel 410. The primary linear illuminator 412 is located adjacent to the first light incident surface 402 of the light guide plate 422, and can cooperate with the secondary linear illuminator 413 to provide enough light beams for the primary liquid crystal panel 430. The first and second linear illuminators 412, 413 can be cold cathode fluorescent lamps (CCFLs) or hot cathode fluorescent lamps (HCFLs). In the illustrated embodiment, the primary linear illuminator 412 has a greater length and greater power than those of the secondary linear illuminator 413.

In operation, the primary and secondary linear illuminators 412, 413 are lit up to illuminate the primary liquid crystal panel 430 when the primary liquid crystal panel 430 is controlled to display. On the other hand, only the second linear illuminator 413 is lit up to illuminate the secondary liquid crystal panel 410 when the secondary liquid crystal panel 410 is controlled to display. In other respects, the laptop computer has features and advantages similar to those described above in relation to the laptop computer 3.

Further or alternative embodiments may include the following. In a first example, the light guide plate 422 includes only one light incident surface 402/403. In such case, the first and second linear illuminators 412, 413 are located adjacent to the same incident surface 402/403 of the light guide plate 422. In a second example, the primary linear illuminator 412 can independently provide enough light beams for the primary liquid crystal panel 430. In such case, only the primary linear illuminator 412 is lit up to illuminate the primary liquid crystal panel 430 when the primary liquid crystal panel 430 is controlled to display, and the secondary linear illuminator 413 is switched off. In a third example, the above-described double-sided liquid crystal displays 30, 40 can also be employed in apparatuses such as mobile phones, personal digital assistants, and other suitable devices which need dual display.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A double-sided liquid crystal display comprising:
    a light guide plate comprising a first light emitting surface and a second light emitting surface, the first and second light emitting surfaces being configured for light emission;
    a plurality of illuminators configured for providing light beams for the light guide plate;
    a first liquid crystal panel configured for receiving the light beams from the first light emitting surface;
    a second liquid crystal panel configured for receiving the light beams from the second light emitting surface;
    a driving circuit comprising a first driving unit, a second driving unit, a switching unit and a main system, the first driving unit configured for driving the first liquid crystal panel, and the second driving unit configured for driving the second liquid crystal panel; and
    a Hall-effect switch configured for monitoring a rotation status of the first liquid crystal panel and generating corresponding variation signals;
    wherein the switching unit is configured for switching the first driving unit and the second driving unit according to the variation signals, the main system is configured for providing voltages and data signals for the first and second driving units, the switching unit comprises a first channel and a second channel, and the first channel is switched on or off and the second channel is switched on or off according to the corresponding variation signals from the Hall-effect switch;
    when the first channel is switched on, the main system provides the voltages for the first driving unit via the first channel, and the second driving unit is switched off; and when the second channel is switched on, the main system provides the voltages for the second driving unit via the second channel, and the first driving unit is switched off; and
    when the first liquid crystal panel is configured to display, all the illuminators are lit up to illuminate the first liquid crystal panel; and when the second liquid crystal panel is configured to display, only a fraction of the illuminators is lit up to illuminate the second liquid crystal panel, wherein the fraction of the illuminators comprises at least one illuminator.

2. The double-sided liquid crystal display as claimed in claim 1, wherein a size of the first liquid crystal panel is greater than that of the second liquid crystal panel.

3. The double-sided liquid crystal display as claimed in claim 2, further comprising a reflective film, wherein the reflective film is arranged between the second light emitting surface and the second liquid crystal panel.

4. The double-sided liquid crystal display as claimed in claim 3, wherein the reflective film comprises a window defined therein, a position and a size of the window respectively correspond to those of the second liquid crystal panel, and the reflective film further comprises a reflective surface facing toward the second light emitting surface.

5. The double-sided liquid crystal display as claimed in claim 1, wherein the light guide plate further comprises a light incident surface configured for light incidence, the illuminators are located adjacent to the light incident surface, and the illuminators are light emitting diodes.

6. The double-sided liquid crystal display as claimed in claim 5, wherein the first and second light emitting surfaces are respectively adjacent to the light incident surface, and the first light emitting surface is opposite to the second light emitting surface.

7. The double-sided liquid crystal display as claimed in claim 5, wherein the light guide plate further comprises another light incident surface configured for light incidence.

8. The double-sided liquid crystal display as claimed in claim 7, wherein the illuminators comprise at least two linear lamps respectively arranged adjacent to the two light incident surfaces, and the linear lamps are selected from the group consisting of cold cathode fluorescent lamps and hot cathode fluorescent lamps.

9. A laptop computer comprising:
a host;
a double-sided liquid crystal display adjacent to the host, the double-side liquid crystal display comprising;
a light guide plate comprising a first light emitting surface and a second light emitting surface, the first and second light emitting surfaces being configured for light emission;
a plurality of illuminators configured for providing light beams for the light guide plate;
a first liquid crystal panel configured for receiving the light beams from the first light emitting surface; and
a second liquid crystal panel configured for receiving the light beams from the second light emitting surface;
a Hall-effect switch configured for monitoring variations of degrees and directions of an angle of the double-sided liquid crystal display relative to the host and generating corresponding variation signals;
a first driving unit;
a second driving unit
a switching unit comprising a first channel and a second channel; and
a main system;
wherein the double-sided liquid crystal display is pivotally engaged to the host via a spindle, and is pivotally rotatable relative to the host about the spindle;
when the first liquid crystal panel is configured to display, all the illuminators are lit up to illuminate the first liquid crystal panel; and when the second liquid crystal panel is configured to display, only a fraction of the illuminators is lit up to illuminate the second liquid crystal panel, wherein the fraction of the illuminators comprises at least one illuminator;
the first driving unit is electrically connected to all the illuminators, and the second driving unit is electrically connected to the fraction of the illuminators;
the switching unit is configured for switching the first driving unit and the second driving unit according to the variation signals from the Hall-effect switch, the main system is configured for providing voltages and data signals for the first and second driving units, and the first channel is switched on or off and the second channel is switched on or off according to the corresponding variation signals from the Hall-effect switch;
when the first channel is switched on, the main system provides the voltages for the first driving unit via the first channel, all the illuminators are lit up to illuminate the first liquid crystal panel, and the second driving unit is switched off; and
when the second channel is switched on, the main system provides the voltages for the second driving unit via the second channel, the fraction of illuminators are lit up to illuminate the second liquid crystal panel, and the first driving unit is switched off.

10. The double-sided liquid crystal display as claimed in claim 1, wherein the first driving unit is further electrically connected to all the illuminators, the second driving unit is further electrically connected to the fraction of the illuminators, and when the first channel is switched on, all the illuminators are lit up to illuminate the first liquid crystal panel, and when the second channel is switched on, the fraction of illuminators is lit up to illuminate the second liquid crystal panel.

11. The laptop computer as claimed in claim 9, wherein when the angle of the double-sided liquid crystal display relative to the host is in a predetermined range from 100 to 150 degrees, the first channel of the switching unit is switched on.

12. The laptop computer as claimed in claim 9, wherein when the angle of the double-sided liquid crystal display relative to the host is in a predetermined range from 0 to 30 degrees, the second channel of the switching unit is switched on.

* * * * *